April 24, 1962  E. C. HALLOCK  3,031,045
STRUCTURAL MEMBER FOR HOLLOW SPARS, BEAMS, AND LOUVER BLADES
Filed April 3, 1958
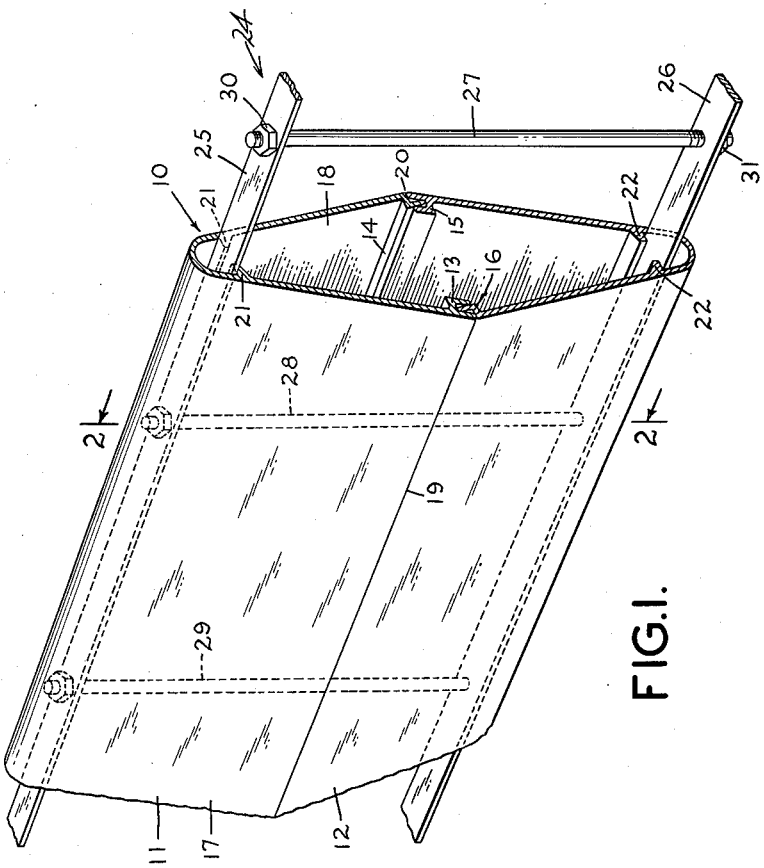
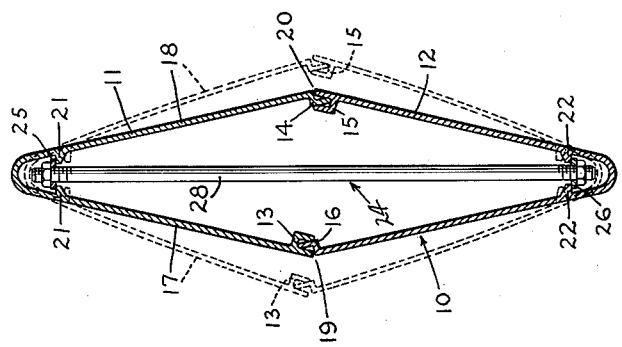
INVENTOR
EDWARD C. HALLOCK
BY
HIS ATTORNEYS

United States Patent Office 3,031,045
Patented Apr. 24, 1962

3,031,045
STRUCTURAL MEMBER FOR HOLLOW SPARS, BEAMS, AND LOUVER BLADES
Edward C. Hallock, 9 Irish Road, Summit, N.J.
Filed Apr. 3, 1958, Ser. No. 726,211
9 Claims. (Cl. 189—34)

This invention relates to improvements in structural members and to methods of making such structural members and its relates particularly to improved hollow, lightweight beams, spars, louver blades and the like, and to methods of making them.

Hollow structural members generally of the types referred to above usually have been fabricated from elements such as plates, angles and the like, by welding, riveting or otherwise joining the elements together. The production of structural members by such methods is expensive and time-consuming.

Structural elements to be fabricated into hollow structural members can be produced readily and at reasonable cost by extrusion of plastic metal through die orifices. However, attempts to produce hollow structural members by extrusion have not been very successful because of the difficulty in providing suitable dies and controlling the wall thickness and other characteristics of the hollow members. For that reason, it has become common to make elements of hollow structural members by extrusion and then to fabricate the extrusions into the finished hollow structural member. While the use of extrusions reduces the cost of the hollow structural members, nevertheless the fabrication of the extrusions into hollow structural members is expensive, time-consuming and not altogether satisfactory.

In accordance with the present invention, a method is provided for assembling extruded forms in such a manner as to produce pre-stressed hollow structural members of exceptional strength and rigidity in proportion to their weight and cross-sectional dimensions.

More particularly, the method according to the invention includes the steps of assembling a pair of similar channel-like elements in edge-to-edge relation to form a hollow body and then compressing the elements to enable a connecting element to be inserted between the elements and, after release of compression thereon to retain them in stressed condition to form a hollow structure of increased rigidity and strength.

The process is particularly adapted to the manufacture of elements of relatively wide and shallow cross-section such as louver blades, aircraft framing elements such as spars, stringers, longerons and the like, of airfoil, oval, diamond, rectangular or other desired cross-sectional shape.

For a better understanding of the present invention, reference may be had to the accompanying drawing in which:

FIGURE 1 is a perspective view of a portion of a typical structural element of the type embodying the present invention with parts broken away to disclose details thereof; and FIGURE 2 is a view in cross-section taken on line 2—2 of FIGURE 1 with the structural element shown also in compressed condition, in dotted lines.

The invention will be described with reference to the production of a louver blade of hollow, diamond-shaped cross-section and of substantial length. The invention is not limited to the construction of louver blades and is useful for the production of hollow structural members of many different cross-sectional shapes and dimensions as will be apparent from the following description of a typical method and product.

As shown in FIGURES 1 and 2, the louver blade 10 made in accordance with the present invention is formed of two substantially identical channel elements 11 and 12 which may be, for example, aluminum or aluminum alloy extrusions. The element 11 is generally of V-shaped cross-section and has at one edge a channel 13 and at the opposite end an offset flange 14 which is adapted to fit into a channel 15 on the element 12. An offset flange 16 on the element 12 engages in the channel 13. The side walls 17 and 18 of the element 11 and the corresponding walls of the element 12 are of unequal length so that the joints 19 and 20 between the channels 13 and 15 and the flanges 14 and 16 lie at the opposite corners of the blade 10 and substantially in the median plane of the blade.

The channel elements 11 and 12 have pairs of inwardly extending internal flanges 21, 21 and 22, 22 adjacent their apices to aid in clamping the channel elements together.

A ladder member 24 of the type disclosed in FIG. 1 has proved to be most suitable for assembling and clamping the elements 11 and 12 together. The ladder member 24 includes a pair of metal straps 25 and 26 connected at intervals by means of tie rods or bolts 27, 28, 29, etc., having nuts 30, 31 on one or both ends to adjust the spacing between the straps 25 and 26. The nuts are adjusted on the tie rods 27 so that the spacing between the straps or rails 25, 26 of the ladder-like structure is slightly less than the spacing between the flanges 21, 21, 22 and 22 of the two assembled sections 11 and 12.

In order to insert the ladder-like structure into the assembled channel elements 11 and 12, pressure is applied to their apices to compress them and to cause the side walls thereof to spread generally to the dotted line position shown in FIGURE 2, thereby decreasing the distance between the flanges 21, 21 and the flanges 22, 22. The ladder member 24 is slipped endwise into the space between the assembled elements 11 and 12 with the straps 25 and 26 disposed outwardly of the flanges 21, 21 and the flanges 22, 22. After the ladder member 24 has been fully inserted, the pressure on the apices of the elements 11 and 12 is relieved so that they can spring back, thereby engaging the flanges 21, 21 and 22, 22 with the straps 25 and 26, respectively. Inasmuch as the spacing between the straps 25, 26 is less than the spacing between the flanges 21, 21 and 22, 22 when the channel elements 11 and 12 are relieved of compression, it will be apparent that they cannot spring back fully to their original shape and are in a stressed condition. The stresses on the channel elements retain the flanges 14 and 16 tightly in the channels 13 and 15 so that the elements 11 and 12 cannot slide relatively. Inasmuch as the elements 11 and 12 cannot slip or shift relatively, and the blade 10, as a whole, is stressed by the ladder member 24, the strength and rigidity of the blade is substantially greater than that of an unstressed hollow blade of similar weight and shape.

The hollow blade 10 is, of course, not liquid-tight nor is it intended to be, but it and other hollow members in accordance with the invention, can be rendered liquid-tight by the inclusion of packings in the channels 13 and 15.

When the elements are formed of aluminum, aluminum alloys or other light metal, very strong and rigid, lightweight spars, louvers, beams and other hollow members can be produced.

The term "apex" or "apices" as used in the claims refers to the portion connecting and interposed between the side walls of each of the channel members which are assembled to form spars, stringers, longerons and the like, of airfoil, oval, diamond, rectangular or other desired cross-sectional shape.

It will be understood that the new method can be used for the manufacture of relatively short structural members such as panels and the like, and that the tie rods can be inserted individually from opposite ends of the assembly of channel elements and the straps 25 and 26 can be omitted when the length of the elements permits.

Accordingly, the exemplary structural member and the method of making the same disclosed herein, should be considered as illustrative and not as limiting the scope of the following claims.

I claim:

1. A structural member comprising a pair of elongated structural elements of channel-like cross-section having open sides in confronting relation, oppositely directed apices and side walls extending inwardly from said apices into edge-to-edge engagement, opposed flanges within each structural element adjacent to said apices thereof, and tie members engaging and extending between the flanges in said structural elements and stressing and holding said structural elements together.

2. The structural member set forth in claim 1, in which said side walls of said structural element have interfitting means on the engaging edges thereof.

3. A structural member comprising a pair of structural elements of substantially V-shaped cross-section, each having an apex and side walls diverging from said apex, said side walls having free edges, means on the free edges of the side walls of one structural element engaging and interfitting with the free edges of the side walls of the other structural element, opposed projections extending inwardly from the side walls of each structural member adjacent to the apex thereof, and retaining means connecting the opposed projections of one structural element with the opposed projections in the other structural element and stressing and holding said structural elements in engagement.

4. The structural member set forth in claim 3, in which said retaining means compresses a pair of strap-like members engaging said opposed projections, and spaced apart tie members connecting said strap-like members along their lengths.

5. A structural member comprising a pair of opposed channel-like elements, each element having an apex, a pair of side walls extending therefrom and an open side therebetween, said side walls having free edges, means on the free edges of the side walls of one of said elements interfitting with the free edges of the side walls of the other element, opposed projections in the interiors of said elements adjacent to said apices thereof, and retaining means engaging said projections and holding said elements in slightly compressed relation to stress them.

6. The structural member set forth in claim 5, in which said retaining means comprises a ladder-like member having a pair of strap-like side rail members engaging said opposed projections, and spaced apart tie members connecting said side-rail members along their lengths.

7. A structural member comprising a pair of elongated structural elements of channel-like cross-section having oppositely directed apices, open sides in confronting relation and side walls in edge-to-edge engagement, tie members extending into the interiors of said structural elements through the open sides, and means within said structural elements adjacent to said apices thereof engaging said tie members for holding said side walls in edge-to-edge engagement and subjecting them to compression stresses.

8. A structural member comprising a pair of elongated structural elements of channel-like cross-section having open sides in confronting relation and side walls in edge-to-edge engagement, one wall of each element having a substantially flat edge and the other wall having an edge containing a groove for receiving the flat edge of the confronting element, tie members extending into the interiors of said structural elements through their open sides, and means within said structural elements engaging said tie members for holding the flat edge of each element in the groove of the confronting element and subjecting the elements to compression stresses.

9. The structural member set forth in claim 8 in which said substantially flat edge comprises a flange off-set inwardly with respect to the outer surface of said one wall.

References Cited in the file of this patent

UNITED STATES PATENTS

| 284,824 | Davis | Sept. 11, 1883 |
| 908,127 | Passmore | Dec. 29, 1908 |
| 2,091,542 | Frati | Aug. 31, 1937 |
| 2,364,494 | Upson | Dec. 5, 1944 |
| 2,382,356 | Watter | Aug. 14, 1945 |
| 2,420,715 | Millward | May 20, 1947 |

FOREIGN PATENTS

| 585,656 | Germany | Oct. 10, 1933 |